June 25, 1929.  L. K. MARSHALL  1,718,750
METHOD OF MANUFACTURING BIMETALLIC THERMOSTATS
Filed Feb. 26, 1925
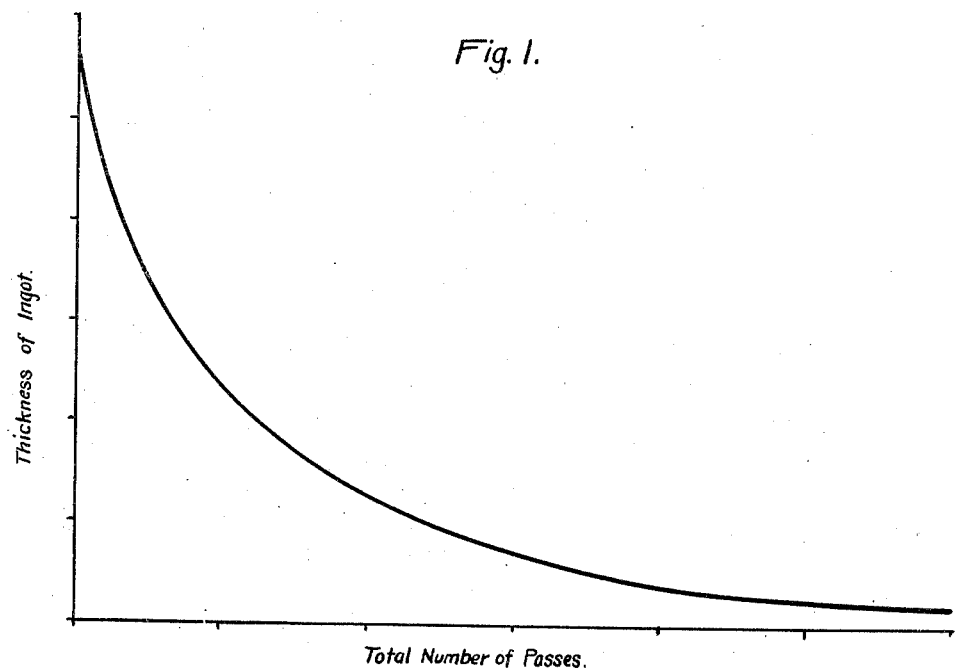
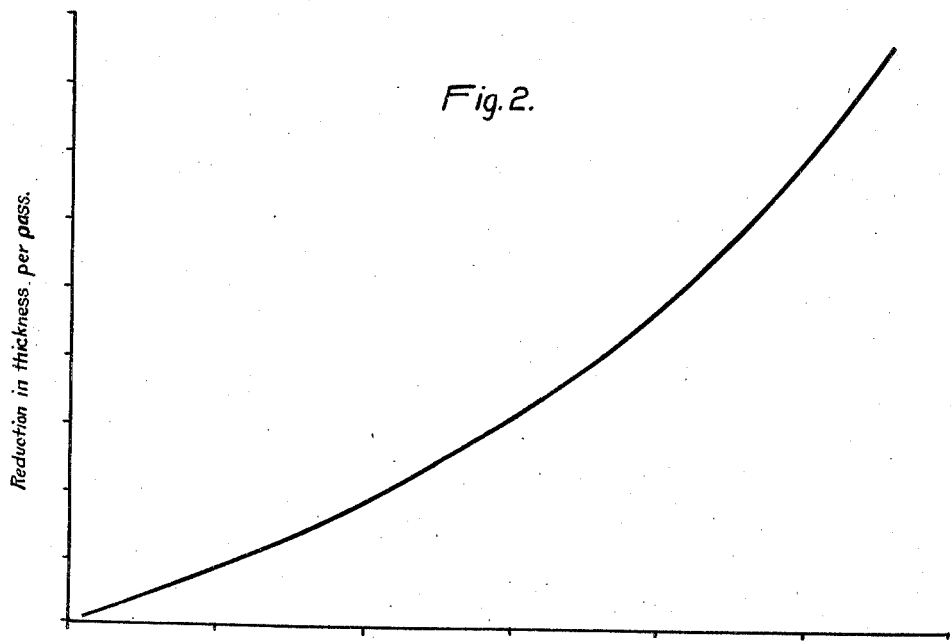
INVENTOR
Laurence K. Marshall.

Patented June 25, 1929.

1,718,750

UNITED STATES PATENT OFFICE.

LAURENCE K. MARSHALL, OF WEST SOMERVILLE, MASSACHUSETTS, ASSIGNOR TO SPENCER THERMOSTAT COMPANY, OF CAMBRIDGE, MASSACHUSETTS, A CORPORATION OF MASSACHUSETTS.

METHOD OF MANUFACTURING BIMETALLIC THERMOSTATS.

Application filed February 26, 1925. Serial No. 11,897.

My invention relates to thermostatic devices and particularly to methods of manufacturing bimetallic thermostats.

One object of my invention is to provide a method of manufacturing bimetallic elements that shall result in a device possessing the proper characteristics for operating at relatively high temperatures and over a relatively large temperature range.

In practicing the method embodying my invention, I first braze two metal ingots of relatively large and substantially equal thickness together, employing a sheet of a metal bond of appreciable thickness therebetween, at a temperature sufficiently high to cause the metal bond strip to become fluid and flow out between the two tightly clamped ingots. The heating is done in such manner that the brazing operation uniting the two ingots is effected substantially simultaneously over the entire engaging surfaces of the two ingots.

The cold compound bar is then subjected to repeated passes or rollings between adjacent rolls, the reduction in the thickness of the compound bar being in accordance with a predetermined curve. After predetermined numbers of passes, the compound bar is annealed for a short period of time and the bar is finished by a plurality of passes with no final annealing, the final number of passes being such as to effect a reduction to the desired minimum thickness, while at the same time, effecting the desired hardening thereof.

In the single sheet of drawings,

Figure 1 is a curve illustrating the thickness of the compound bar as depending upon the number of passes, and Fig. 2 is a curve illustrating the amount by which the thickness of the compound bar is reduced, shown as a function of the thickness of the bar.

In manufacturing a bimetallic thermostatic element, or member, I preferably employ an ingot of Monel metal, that is initially approximately $\frac{9}{32}$" thick, about $3\frac{1}{2}$" wide and about 12" long. One surface of this ingot is ground in order to provide a relatively smooth surface for brazing. The other member is an alloy of nickel steel containing approximately 42% of nickel, and of slightly greater width and length, but of substantially the same thickness as the Monel metal bar.

While I have given particular dimensions of the ingots, they are given by way of example only and I do not wish to be restricted to these particular dimensions except in so far as the thickness of the two ingots should be substantially the same. The nickel steel ingot is also ground on one of its flat faces in order to provide a relatively smooth surface for brazing.

I have found that a thermostatic bimetallic device comprising the two hereinbefore mentioned alloys, one of which is an alloy of nickel and copper, and the other of which is an alloy of nickel and steel, having substantially the same ductility is very effective for the desired purpose. I provide a relatively heavy ingot of each of the two alloys and subject them to repeated rollings, as will be hereinafter set forth in detail. I employ ingots of substantially the same thickness, whereby, with the proper rolling, I obtain a finished bimetal member in which the two parts thereof are of substantially the same thickness.

The bimetallic element comprises the two hereinbefore described ingots together with an intermediate layer of phosphor bronze. As the grinding operations may not be such as always to produce ingots of the different alloys of substantially the same thickness, I so select the bars of the different alloys that they do not differ in thickness by more than .005". The strip of phosphor bronze is approximately .006" thick and of substantially the same length and width as the hereinbefore described Monel metal bar.

The two bars and the bronze strip or sheet are assembled in clamping members, of substantially stirrup shape, made of an alloy, that will retain its shape and strength at the relatively high temperature to which the ingots are subjected to effect a brazing operation. I prefer to employ not less than three of these clamping members over the length of the assembled bars, which, as noted above, is approximately 12".

A paste of borax and water is applied to the assembled ingots to provide a fillet between the edges of the Monel metal and the projecting nickel steel ingot. The borax fuses and seals the space before the plates have been heated to such a temperature as to cause oxidation of the phosphor bronze strip located between the ingots. The heating is effected by placing the assembly in a furnace wherein the heat is provided preferably at substantially the bottom portion thereof.

During the heating operation, the clamps are tightened at frequent intervals to compensate for the expansion of the clamping members. When the assembly has been heated to such temperature as to be at a dull red heat, it is taken out and strongly compressed by suitable means, such as a screw press in order to permit of further tightening of the clamping bolts in order to take up any slack that may have been caused by the expansion of the clamping members themselves.

The assembly is then replaced in the furnace and further heated until the bronze has flowed out from between the slabs. This heating requires very careful attention in order that the entire assembly may be heated to substantially the same temperature to effect fusion of the bronze over substantially the entire engaging surfaces of the two ingots at substantially the same instant. In other words, what is desired to be effected, is a uniform heating of the two ingots so that they will be in their expanded condition corresponding to the same temperature, and that fusion thereof will take place simultaneously over the entire engaging surfaces. After it is noted that fusion has been completed, the assembly is withdrawn from the furnace and again tightly clamped in the press for a short period of time. The assembly is then allowed to cool in the open air and as the brazing thereof has been effected at the relatively high temperature necessary to effect fusion of the phosphor bronze bond, the assembly will take a bent or arcuate form upon cooling by reason of the unequal temperature expansivities of the component metal members.

The hereinbefore described pressing operation has resulted in producing a compound or bimetallic member that is slightly larger in thickness than .500″. It is then reduced in thickness by being passed between adjustable rolls while in a cold condition. The amount of reduction effected by each pass or rolling is greater during the initial passes than during the latter passes and is substantially in accordance with the thickness of the compound bar.

Fig. 1 of the drawing illustrates the thickness of the compound bar in its relation to, or as a function of, the number of passes. Fig. 2 illustrates the reduction in the thickness at each pass or rolling as a function of the thickness of the compound bar. It will be noticed that the reduction of bar is according to a predetermined curve as well as is the amount of reduction for each pass, which curves are illustrated in the drawings.

After predetermined numbers of passes, it is necessary to anneal the compound bar, which is done by heating the bar up to about 1500° F. in a suitable furnace chamber and permitting it to remain at that temperature for approximately 10 to 15 minutes, after which it is allowed to cool in the open air.

The compound bar is subjected to approximately 7 annealing operations at the temperatures and by the method hereinbefore noted, but no annealing is done after the final rolling of the compound bar. As hereinbefore stated, the thickness of the bimetallic member or assembly after having been united by fusion is approximately .500″. The compound bar is rolled a sufficient number of times to reduce the thickness thereof to substantially .020″ and as the ductility of the two alloys comprising the bimetallic member is substantially the same, the thickness of the respective elements of the bimetallic member will be substantially one-half that of the total thickness of the compound bars.

The number of rollings between the annealing is greater when the compound bar becomes thinner and it is necessary to reduce the amount by which the compound bar is reduced in thickness during each rolling, as the compound bar becomes thinner.

After the last annealing, the compound bar is subjected to a reduction in thickness, substantially in accordance with the hereinbefore described curves until, as noted above, the thickness is substantially .020″ and simultaneously the hardness thereof is such as will provide a bimetallic thermostatic member that may be subjected to repeated operations at the relatively high temperature of substantially 300° C. without any substantial change in the operating characteristics thereof.

The number of rollings to which the compound bar is subjected as the final operation is, as noted above, sufficient to reduce it to the desired minimum thickness and simultaneously to effect a hardness thereof that is substantially the same as that of the metal of the ingots.

The hereinbefore described method of pressing, rolling and heat treating results in a compound thermostatic bar that will withstand the repeated operations demanded of it in actual service without loss of any of the characteristics which cause it to respond properly to temperature changes and without appreciable loss of such characteristics during any continued periods of use.

Since various modifications and changes may be made without departing from the spirit and scope of the invention, I desire that only such limitations shall be placed thereon as are imposed by the prior art.

I claim as my invention:

1. The method of manufacturing a bimetallic thermostatic member, which comprises subjecting a bimetallic ingot, of substantial thickness, to repeated cold rollings, and to a plurality of heat treatments at substantially 1500° F., after predetermined numbers of rollings, the final step being a plurality of cold rollings of said member, the decrease in the thickness of the member for each rolling varying substantially directly in accordance with the thickness thereof.

2. The method of manufacturing a bimetallic thermostatic member, which comprises subjecting a bimetallic ingot, of substantial thickness, to repeated cold rollings, the decrease in the thickness of the ingot for each rolling varying substantially directly in accordance with the thickness thereof.

3. The method of making bimetallic elements which comprises tightly clamping two metal ingots, each of substantially the same thickness and having substantially the same ductility, with a metal bond strip therebetween, heating the same to effect a fusing of the bond and union of the two ingots, substantially simultaneously over the entire engaging surfaces thereof and cold rolling the same to effect substantially the same reductions in the thickness of the two united ingots, the decrease in the thickness of the united ingots for each rolling varying substantially directly in accordance with the thickness thereof.

4. The method of making bimetallic elements which comprises tightly clamping two metal ingots, each of substantially the same thickness and having substantially the same ductility, with a metal bond strip therebetween, heating the same to effect a fusing of the bond and union of the two ingots, substantially simultaneously over the entire engaging surfaces thereof, cold rolling the same to effect substantially the same reductions in the thickness of the two united ingots in successively decreasing increments, heat treating the compound bar after predetermined numbers of rollings to soften the same, and finishing the same by a plurality of cold rollings to obtain a predetermined hardness of the metals.

5. The method of treating high temperature bimetallic material which consists in alternately cold rolling and heat treating the material, increasing the number of passes in the cold rolling operation between each consecutive heat treating operation.

6. The method of treating bimetallic material which consists in cold rolling the material a predetermined number of passes to reduce its cross section a predetermined amount, heat treating the material, again cold rolling the material a larger number of passes to reduce its cross section a lesser predetermined amount, again heat treating at the same temperature as the first heat treatment, again cold rolling the material a still larger number of passes to reduce its cross section a still lesser predetermined amount, again heat treating the material at the same temperature and continuing the alternate rolling with gradually increasing number of passes and heat-treatment at the same temperature until the material has the desired thickness and temperature characteristics.

7. The method of joining two metals which consists in pressing two flat plates of the metals together with an intermediate bonding metal, applying a paste of borax and water to the junction edges, and heating until fusion of the bonding metals occurs.

In testimony whereof, I have hereunto subscribed by name this 20th day of February, 1925.

LAURENCE K. MARSHALL.